United States Patent [19]

Black

[11] Patent Number: 4,706,277

[45] Date of Patent: Nov. 10, 1987

[54] INTERFACE CIRCUIT FOR TRANSMITTING COMMAND CODES TO AN ATTENDANT CONSOLE

[75] Inventor: James B. Black, Phoenix, Ariz.

[73] Assignee: GTE Communications Systems, Phoenix, Ariz.

[21] Appl. No.: 813,187

[22] Filed: Dec. 24, 1985

[51] Int. Cl.$^4$ ............................................. H04M 3/42
[52] U.S. Cl. ...................................... 379/242; 379/229
[58] Field of Search ............... 379/242, 229, 230, 231, 379/232, 233, 234, 284, 267, 220

[56] References Cited

U.S. PATENT DOCUMENTS 4,160,129  7/1979  Peyser et al. ........................ 379/220

Primary Examiner—James L. Dwyer
Attorney, Agent, or Firm—Anthony Miologos; Peter Xiarhos

[57] ABSTRACT

An interface circuit for transmitting data messages between a CENTREX equipped central office exchange and a remotely located attendant console. The interface circuit includes control and sense decoding circuitry arranged to output control signals to the interface circuit and transfer control signals and data messages to the CENTREX. Sequential memory connected to the control and sense decoding circuitry receives and stores from the CENTREX data messages responsive to an enabling signal from the CENTREX. The control and sense decoding circuitry signals a controller connected to the sequential memory that data messages have been loaded in the sequential memory. The controller then transfers the data messages out of the sequential memory and processes the received data messages, storing the data messages in a temporary memory. The controller transfers the data messages from the temporary memory to sending circuitry which transmits the data messages to the attendant console.

13 Claims, 6 Drawing Figures

INTERFACE CIRCUIT FOR TRANSMITTING COMMAND CODES TO AN ATTENDANT CONSOLE

CROSS-REFERENCE TO RELATED APPLICATIONS

The present application is related to the following co-pending U.S. Pat. Applications all having the same inventive entity and being assigned to the same assignee:

Ser. No. 813,322, titled, "A CENTREX ATTENDANT CONSOLE INTERFACE;"

Ser. No. 813,188, titled, "AN INTERFACE CIRCUIT FOR TRANSMITTING KEYCODES TO A CENTREX;"

Ser. No. 813,321, titled, "CONTROL CIRCUIT FOR A CENTREX ATTENDANT CONSOLE INTERFACE;"

Ser. No. 813,186, titled, "AN ARRANGEMENT FOR TRANSFERRING DATA TO A CENTREX;"

Ser. No. 813,185, titled, "AN ARRANGEMENT FOR TRANSFERRING DATA TO AN ATTENDANT CONSOLE;"

Ser. No. 813,176, titled, "AN ARRANGEMENT FOR INITIALIZING A CENTREX CONSOLE INTERFACE CIRCUIT."

BACKGROUND OF THE INVENTION

The present invention relates in general to telecommunication switching systems and more particularly to an interface linking voice and data communications between a CENTREX equipped central office exchange and an attendant console.

Private Branch Exchanges (PBX) are telecommunication systems which provide communication services to customers having a plurality a subscriber instruments. The PBX equipment provides a host of enhanced features such as call forwarding, intercom functions, least cost routing of calls and detailed billing. Normally the PBX is purchased by the customer and installed on premises at his location. Therefore, since the PBX handles a first level of switching among the subscriber instruments fewer central office lines are required and therefore access charges are lower. However, this savings is offset by the initial cost of the PBX equipment.

An alternative to the classical PBX is being offered in the Telecommunication market today which provides all of the features of a PBX without any of the initial costs. This system known in the field as CENTREX (central exchange) allows either a portion of a central office network switching system or a dedicated CENTREX central office network switching system to function and provide the services and features as would a dedicated PBX. The customers subscriber instruments are connected directly to the CO switch or concentrated with a multiplexing device and connected via trunk lines. The telephone operating company providing the service would service the switch therefore, alleviating the customer of maintaining his own equipment. Of course access charges are somewhat higher with the CENTREX than those with the on premises PBX equipment.

Usually PBX equipment includes an attendant console which monitors the PBX, i.e. lines or trunks in use, and provide a means of selecting or deselecting features and services as well as a system status display. Additionally, the console can also serve as a central operator station providing for attendant call handling. Such consoles are also used with CENTREX systems to provide the features discussed above.

It therefore becomes the object of the present invention to provide a console interface circuit to link an attendant console normally located at the customer premises with a CENTREX network system located at a telephone operating companies central office.

SUMMARY OF THE INVENTION

In accomplishing the object of the present invention there is provided an interface circuit for transmitting data messages between a CENTREX equipped central office exchange and a remotely located attendant console.

The central office exchange includes an analog control unit connected to a peripheral processor. The analog control unit includes a control field for sending control signals to the interface circuit and a sense field for receiving control signals and data messages from the interface circuit.

The interface circuit of the present invention includes control and sense decoding means connected to the control and sense fields arranged to output control signals to the interface circuit in response to control signals sent over the control field. The control and sense decoding means also outputs control signals to the analog control unit and inputs data messages to the interface circuit over the sense field.

Sequential memory means connected to the control and sense decoding means receive and store from the peripheral processor data messages. The sequential memory means further includes memory enabling means connected to the control and sense decoding means whereby, responsive to the peripheral processor sending an enabling signal to the memory enabling means the data messages are written to the sequential memory means.

Controller means connected to the sequential memory means and to the control and sense decoding means receives a signal from the peripheral processor signaling the controller means that data messages have been loaded in the sequential memory means. The controller means transfers the data messages out of the sequential memory means in the same order in which the data messages where input. The controller means process the received data messages and stores the data messages in a temporary memory.

The interface circuit further includes sending means connected to the attendant console and to the controller means. The controller means transfers the data messages from the temporary memory to the sending means whereby, the data messages are transmitted to the attendant console.

A BRIEF DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
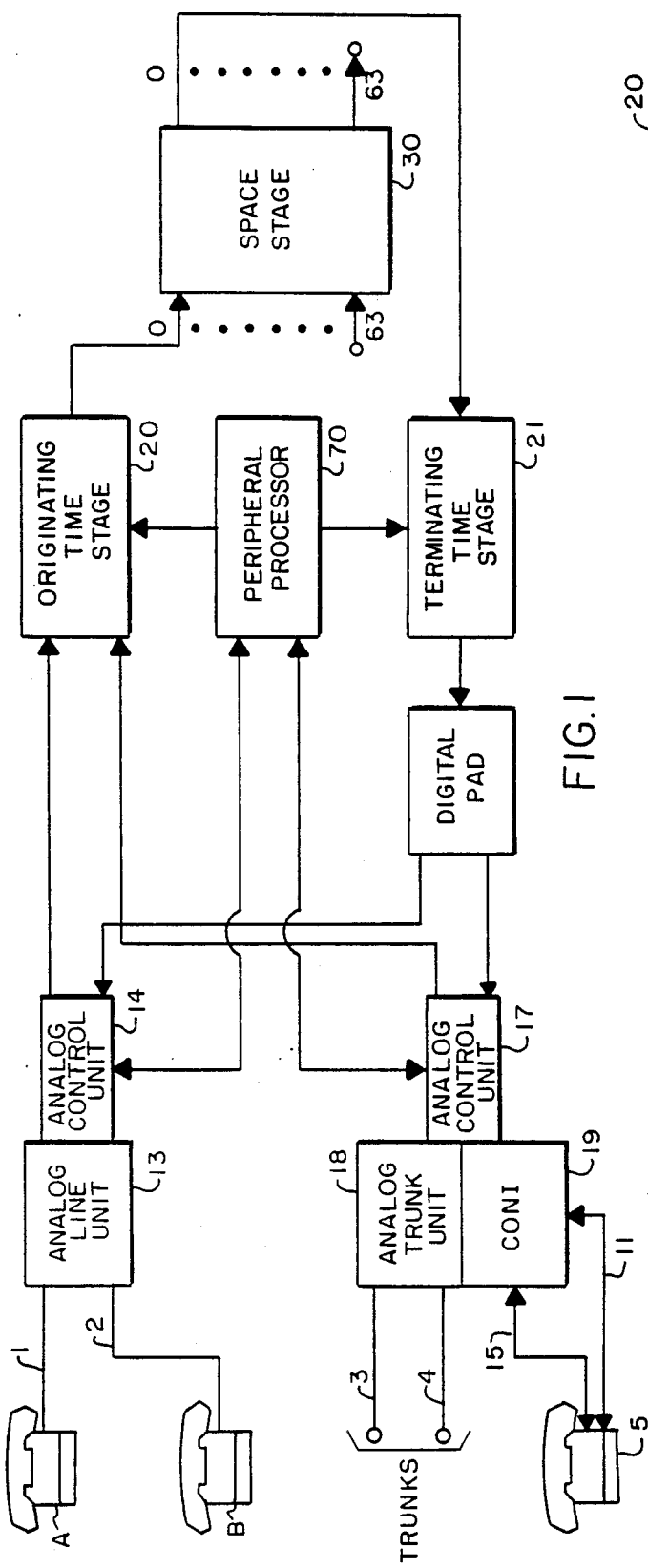
FIG. 1 is block diagram of a CENTREX network system embodying the present invention.

Referring to FIG. 1, a time-space-time digital switching system having a central exchange or CENTREX feature is shown. As a standard central office exchange telephone instruments A and B are connected to the network switching system via analog subscriber lines 1 and 2 to an analog line unit 13. The analog data received is converted to Pulse Code Modulated (PCM) digital signals for output to the next network stage. Analog line unit 13 is connected to analog control unit 14. Originating time switch 20 is connected to a space switch unit 30, which in turn is connected to a terminating time switch 21. Terminating time switch 21 is connected to analog control unit 14 and finally back to analog line unit 13 where the PCM digital signals are converted to analog signals and transmitted down lines 1 and 2.

Terminating time switch 20 is further connected to analog control unit 17, analog trunk unit 18 and trunks 3 and 4. Analog trunk unit 18 can be dedicated exclusively for CENTREX use. The trunk unit 18 connects the CENTREX customers subscriber instruments to the network system.

The Console Interface Circuit (CONI) 19 of the present invention is connected to analog control unit 17 and provides the means by which system commands, display messages and attendant console keycodes are transferred between the attendant console 5 and the CENTREX network system. The operation of the CONI circuit is transparent to both the system and the attendant console. Communication between CONI 19 and console 5 is via a digital data path 15 and an analog talk path 11.

Figure 2:
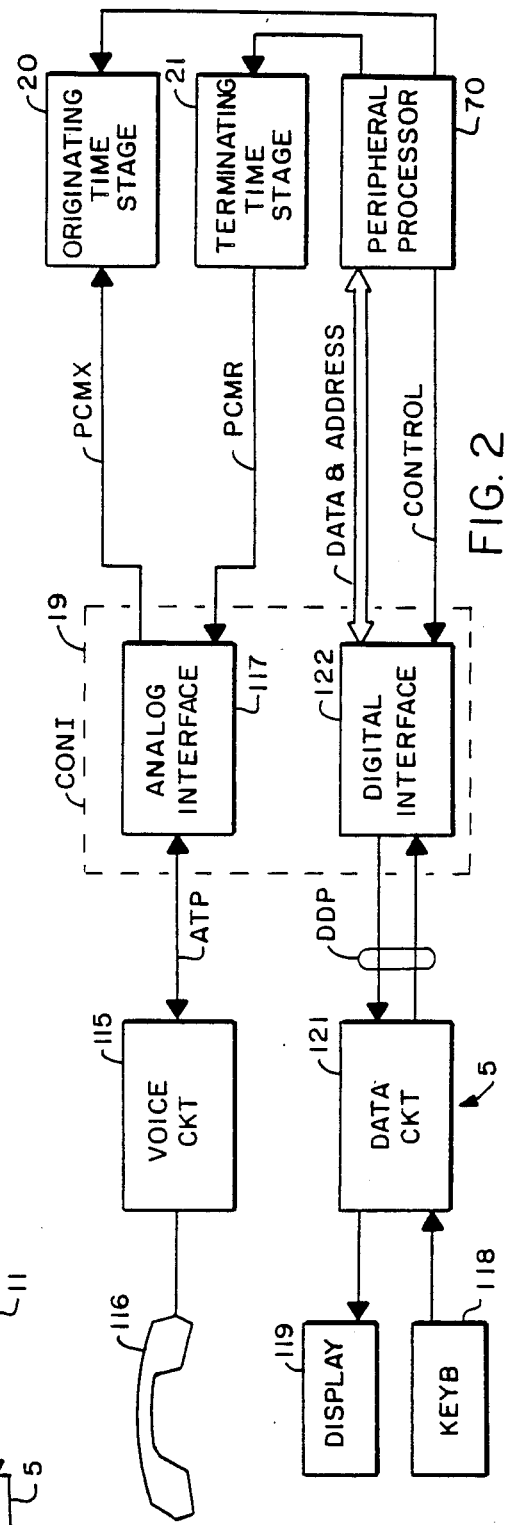
FIG. 2 is block diagram showing the linking paths of the present invention interface the attendant console and the CENTREX network system.

Turning now to FIG. 2, a block diagram illustrating the interface of the attendant console to the CENTREX system is shown. The CONI interfaces the attendant console 5 and CENTREX system via two distinct communication links. In the first link, all analog signals are interfaced from the console handset 116, via voice transmission circuit 116 and analog talk path (ATP) to the analog interface 117 in the CONI 19. The analog signals are converted in the analog interface 117 into pulse code modulated (PCM) signals and transmitted to the originating time stage 20 of the CENTREX network via PCM path PCMX.

Likewise, analog information destined for the attendant console 5, is applied in PCM form to PCM path PCMX from the terminating time stage 21. The PCM information is converted into analog information by the analog interface 117 of CONI 19 and sent to handset 116 through the ATP and voice circuit 115. This communication link forms the talking path between the console 5, the CONI 19 and the network system of the CENTREX.

The data link between the console 5 and the CONI 19 is routed from a keyboard via a console data circuit 121 and a 4 wire full duplex data link (DDL) to the digital interface 122. Data input by the console operator is converted by the data circuit 121 into asynchronous data messages comprising 1 start bit, 7 data bits, an even parity bit and a stop bit. The data messages are transmitted over the DDL via a 1200 baud Frequency Shift Key (FSK) modem located in data circuit 121. The data transmitted by the console is received by the CONI 19 digital interface 122, converted into 8-bit data bytes and is processed by the CONI. The data is passed on to the network via ACU 17 to the peripheral processor 70 if no action is required by the CONI. The CONI thereby assumes a "transparent" front to the CENTREX network system and functions as a transaction exchange medium. Alternatively, in certain cases keycodes and command codes received by the CONI are acted upon and responded to by the CONI.

Data from the peripheral processor 70 in the form of command codes is transmitted to the CONI digital interface 122. Again if the data is destined only for the console the CONI formats the data into FSK asynchronous data messages and transmits the messages over the 1200 baud DDL to the console data circuit 5. The data is interpreted by the console and the appropriate display device 119 activated, i.e. LEDs turn on or off, a message displayed, the display cleared, or an audible alarm turned on or off.

Figure 3:
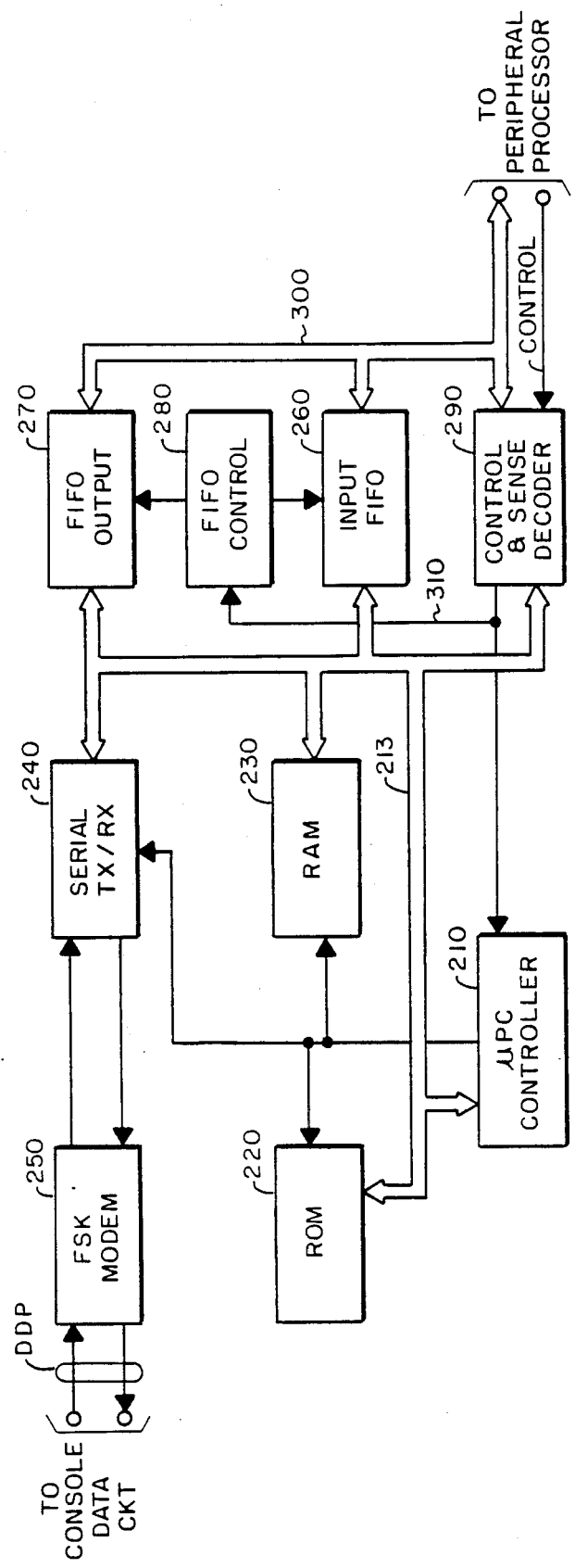
FIG. 3 is a block diagram of the digital line interface of the present invention.

Turning now to FIG. 3, a detailed explanation of the CONI digital interface will be given.

The CONI interface of the present invention is comprised of the following Large Scale Integrated (LSI) devices. A controller portion includes a microprocessor 210 connected to a Read Only Memory (ROM) 220 and Random Access Memory (RAM) 230 through an address/data bus 212. The ROM circuit 220 stores the operating system used by the microprocessor 210 which controls the operation of the CONI interface. The RAM is used as a temporary storage area for the message bytes received by the CONI. This controller portion of the CONI interface is connected to the console 5 via a serial Transmitter/Receiver (Tx/Rx) 240 and a Frequency Shift Key (FSK) modem chip 250.

The serial Tx/Rx is a LSI Universal Serial Asynchronous Receiver Transmitter (USART) such as the Intel 8259. This device under control of the microprocessor translates the 8 data bits sent to the USART on the address/data bus into the asynchronous serial data words described earlier. The FSK modem translates the data into audio tones for the transmission of the data down a twisted pair transmission path DDP.

The connection between the CONI interface and the peripheral processor is accomplished via a pair of 64×4 First In First Out (FIFO) circuits. An input FIFO 260 and an output FIFO 270 each have one side of the FIFOs connected to address/data bus 300 which extends from the peripheral processor. Each FIFO is further connected to the CONI data bus 212. A control and sense decoder 290 is also connected to the peripheral processor address/data bus 300 and CONI address/data bus 212. The control and sense decoder interprets control words sent by the peripheral processor detailing the type of messages sent to the CONI and any special handling that is required. The control and sense decoder 290 also communicates to the microprocessor and a FIFO control circuit 280 via control lead 310.

As explained earlier and shown on FIG. 2 the CONI also includes an audio interface for transmitting analog voice signals between the console 5 and CENTREX network system and CENTREX network system to the console 5. The analog interface between the console 5 and the CONI consists of a single tip and ring voice pair (T and R). On this analog pair voice conversations and DTMF tones are transmitted. The system provides the talk battery on the tip and ring leads which also powers the DTMF generator in the console. The console 5 contains a standard network interface.

Figure 4:
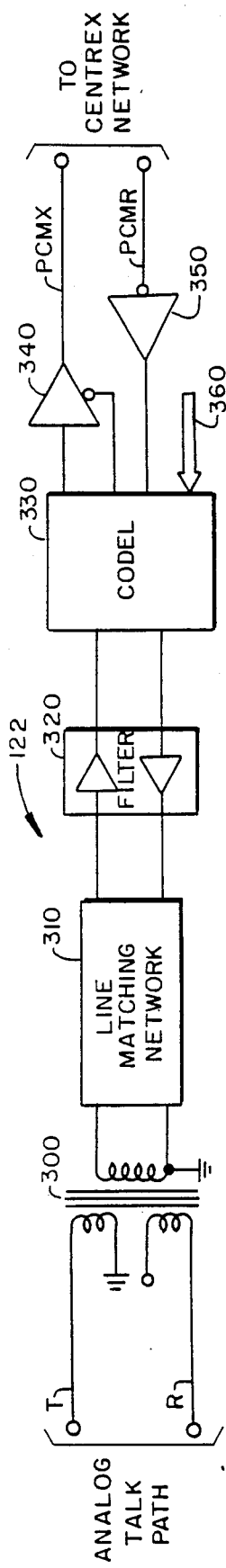
FIG. 4 is a block diagram of the analog line interface.

Turning now to FIG. 4, the analog interface of the CONI is illustrated. The interface 122 includes a two to four wire hybrid coil 300, a line matching network 310 in the form of an electrical hybrid, a transmit and receive amplifier and filter comprised of an INTEL 2912 filter and an INTEL 2910 CODEC (COder/DECoder). The hybrid coil 300 interfaces directly to the line matching network 310. The line matching network includes the necessary components for two balancing networks. This allows the use of −5 volt non-loaded lines or +12 volt loaded lines. The line matching network 310 is connected via lines TX and RX to filter network 320. The TX line connects to a transmit filter in the filter 320 as does the RX line to a receive filter. The filters also have provisions for adding the necessary gain in both the transmit and receive paths. The filter 320 is further connected via lines TX and RX to the CODEC 2910. The output of the transmit filter drives the analog input of CODEC 330. The CODECs primary function is to encode an analog signal into a 8 bit PCM word which is then sent to the network in the proper channel via driver 340 and the PCM transmit bus PCMX.

Similarly, the CODEC 330 will clock in information from the receive PCM bus PCMR and driver 350 during its assigned channel. The binary signal is then decoded into PAM (pulse amplitude modulated) signals by the CODEC and converted into an analog signal by the receive filter of filter 320. The analog signal is then applied to the console via the line matching network and the T and R leads of the hybrid coil 300. Controls signals 360 connected to the peripheral processor allows the CODEC to be programmed to operate in a specific manner i.e. transmit and receive, transmit only or operate within a specific time slot.

It should be noted since the CONI analog interface and digital interface use two distinct communication links to transmit information between the console 5 and the CENTREX network system the analog talk path and the duplex data path may be used simultaneously in transmission and reception of analog and digital data.

Before a detailed explanation of the CONI circuit is given it is believed an understanding of the message structure transmitted between the console and the CENTREX system will be helpful. The messages that are transmitted between the CONI console 5 and the CENTREX system are in an ASCII field format. All characters including numbers are transmitted as ASCII characters. The field format consists of command and data fields strung together to form a command string. This command string is treated as a single message by the console 5 or the CENTREX system. Command and data fields are separated by a "CARRIAGE RETURN" (CR). A message is terminated by a null field which is in this case a double "CARRIAGE RETURN". There is no set field length, but the maximum message length is 64 characters. Each message from the system is followed by a complementary checksum. A checksum is sent with each command code message transmitted by peripheral processor 70. The following are examples of valid command strings:

A 3 field command sent from the system to the console.

XX:MM:DDDDDDDD::C

A 2 field response sent from the console to the system.

XX:DDDDDDDD::C

In the above examples:
X = command code or keycode.
M = command code modifier.
D = command code data.
C = checksum
: = "CARRIAGE RETURN" field delimiter.

All command codes, keycodes, modifiers and data are in a 7 bit ASCII format. The checksum is a 2's complement of the entire command message including the carriage return field delimiters.

Normally the data messages will carry keycodes to the CENTREX system from the console 5 or command codes from the CENTREX system to the console 5. For example, some command codes may include commands to turn on one or more LED's, display a message, clear the display or turn the audible alarm on or off.

Most of the command codes including those mentioned above are handled transparently by the CONI. The term "transparent" as used means that the CONI performs only as a transaction exchange medium. However, there are two exceptions to the previous statements where the CONI circuit interprets the command codes from the CENTREX and acts on the information itself.

INITIATE PHASE 2—This command informs the CONI that it must enter a self-diagnostic mode where it should echo whatever is placed on its control points, back on the sense points.

EXECUTE PHASE 3—This command informs the CONI that it should take the data that follows and treat it as a normal command. However, instead of sending the data to the console 5 the CONI will put the data on the sense points to be read by the system.

The CONI interface circuit communicates to the console 5 and to the CENTREX network system by accepting information from one end and transferring that information to the other. In order for this to be accomplished in the most expedient manner, the CONI uses a priority structure to decide which action to take. The priority is as follows:-

| PRIORITY 1 | highest | console incoming data to CONI |
| PRIORITY 2 | | console outgoing data from CONI |
| PRIORITY 3 | | CONI data from the network |
| PRIORITY 4 | lowest | CONI data to the network |

Figure 5:
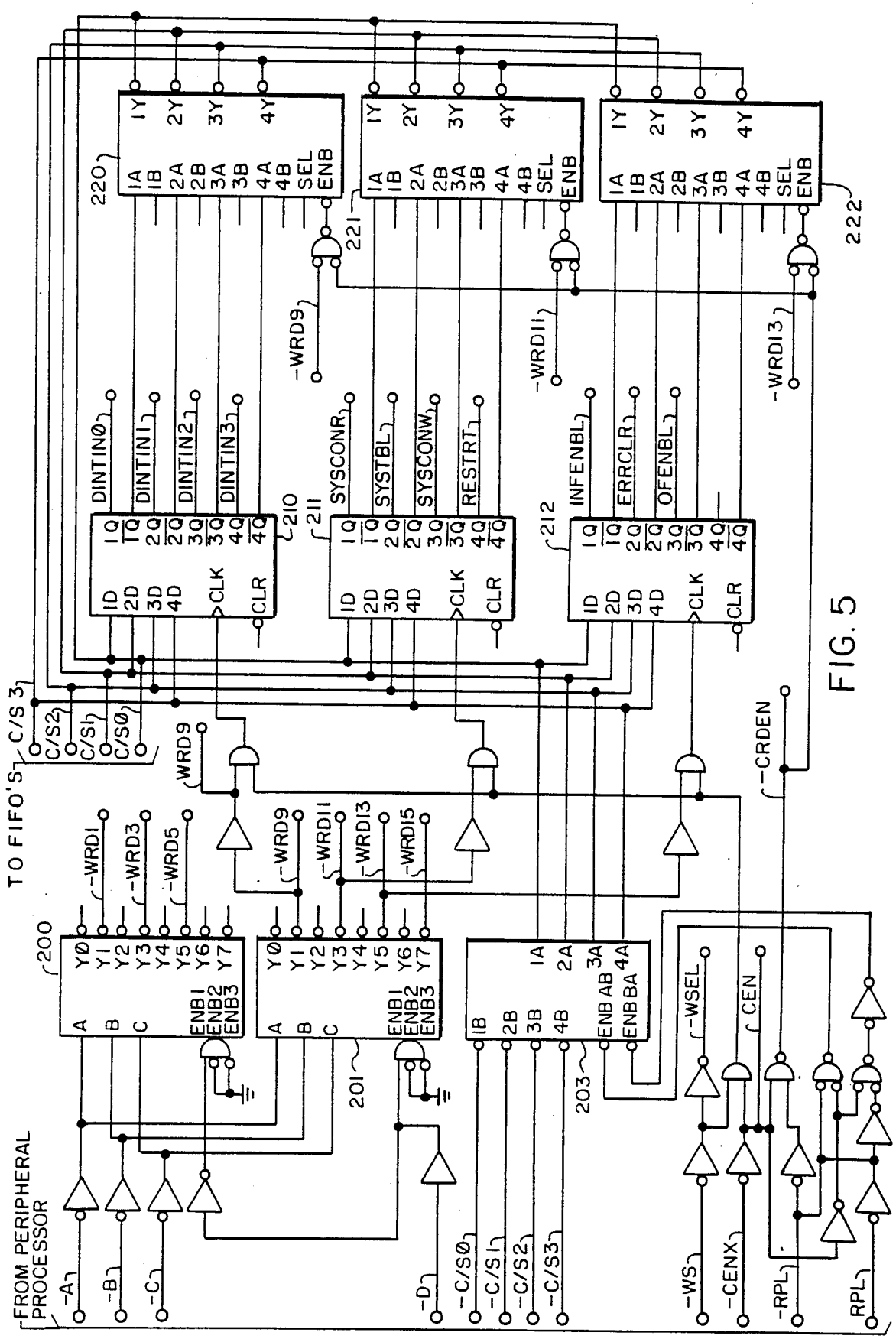
FIG. 5 is schematic of the Control and Sense Decoder shown at FIG. 3.
Figure 6:
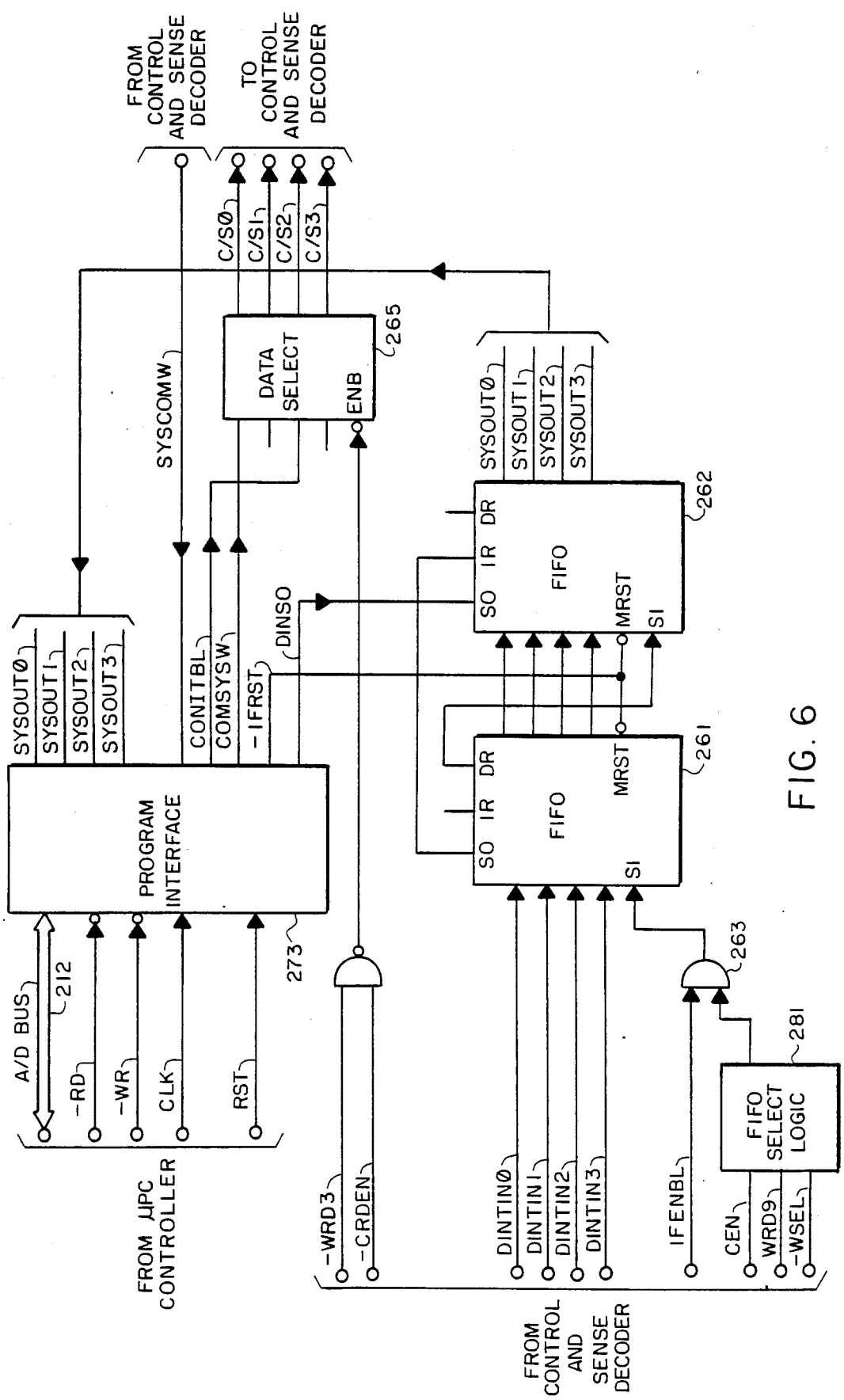
FIG. 6 is a schematic of the Input FIFO shown at FIG. 3 as well as its support circuitry.

Turning now to FIGS. 5 and 6, a detailed schematic of the control and sense decoder 290 and the output FIFO 260 and support circuitry respectively is shown.

The control and sense decoder interfaces the CONI and CENTREX peripheral processor. The circuit is comprised of control point decoders 200 and 201, data transceiver 203, flip-flops 210–212 and data selectors 220–222. In addition, a number of logic gates are used to provide decoding of various read, write and enable control signals.

Decoders 201 and 202 have their inputs connected to the analog control unit (ACU) 17 which is connected to the peripheral processor 70. In all cases the CONI communicates to the peripheral processor 70 via a control and sense field of ACU 17. Decoder inputs −A−−D are address leads which specify a control point or sense point type. For example, a binary "1" (0001) sent to decoders 201 and 202 is interpreted as a WORD 1 control point, setting the decoder 200 output lead labeled −WRD1. As can be seen there are 7 output control words and therefore decoders 200, 201 recognize 7 control points. The control words will be identified later in the explanation of the operation of the CONI. The ACU 17 is further connected to the control sense decoder 290 via a bidirectional data control and sense bus C/S0–C/S3. Message data as well as other control data such as ERROR words are passed between the CONI and the peripheral processor via this bidirectional bus. Finally, write control signals, −WS, −WSEL, read control signals −RPL, RPL and enabling signals −CENX, CEN are input from ACU 17 and decoded and used to write, read and enable the control words and data being transferred between the CONI and the peripheral processor 70. Finally, the control and sense decoder is connected to the input FIFO circuit 270 via bus C/S0–C/S3 and signals DINTOUT0–DINTOUT3 from decoder 210.

Turning now to FIG. 6, the input FIFO circuit 260 of the present invention is shown. The input FIFO circuit is comprised of a pair of 64×4 FIFO circuits 261 and 262 connected in series. FIFO's 261 and 262 have a storage capacity of 128 nibbles. FIFO 262 has its data outputs SYSOUT0–SYSOUT3 connected to complementary inputs SYSOUT0–SYSOUT3 of programmable peripheral interface (PPI) 273. PPI 273 also has a number of output leads which are used in various control and handshaking functions and which will be explained later. The PPI 273 is connected to the CONI address/data bus 212 as well as various read, write and reset control signals extending from the microprocessor 210. Data messages for transmission to the Console 5 are sent to the input FIFO's 261, 262 via flip-flop 210 and bus field DINTIN0–DINTIN3 and out of the FIFO's via bus field SYSOUT0–SYSOUT3 to PPI 273. The received command code message is sent out to the microprocessor via bus 212. PPI 273 is a well known microcomputer peripheral device such as that manufactured and sold by the INTEL CORPORATION as device 8255A.

With renewed reference to FIGS. 5 and 6, an explanation of a data message transfer between the CENTREX and the CONI system will now be given.

The transfer of command code messages to the CONI begins with the peripheral processor reading the ERROR field for an error word. If a value of zero is returned on bus C/S0–C/S3 than there are no errors being reported by the CONI and the data transfer can begin. An error read is signaled by the peripheral processor by setting control point 5 over bus −A−−D. An error circuit (not shown) loads the correct error message on bus C/S0–C/S3 which is output to the peripheral processor.

If no errors are reported, the peripheral processor sets signal IFENBL. Signal IFENBL is loaded from bus C/S0–C/S3 to flip-flop 212 when control word -WRD13 is set at decoder 201. Signal IFENBL is combined with a signal developed at FIFO select logic 281 and gated via AND gate 263 to the Serial In (SI) input of FIFO 261. At this point the FIFO 261 is ready to accept a command code message from the peripheral processor. The command code message is transferred over bus field C/S0–C/S3 in nibble form (4 bit field), high nibble first. The nibble is shifted into flip-flop 210 during the setting of control word −WRD9. The nibble is then output over bus DINTIN0–DINTIN3 to FIFO 261. The command code message being shifted into the FIFO will be in the same format as the console 5 is expecting to receive including checksum characters.

After the entire command code message is transferred to FIFO 261 the peripheral processor sets signal SYSCONW. SYSCONW is input to PPI 273 which alerts microprocessor 210 that a command code message has been transferred to the input FIFO. The microprocessor 210 responds by setting signal CONSYSW and begins transferring the command code message out of the input FIFO's 261 and 262. Signal CONSYSW is sent to the peripheral processor via data selector 265 and bus field C/S0–C/S3. This signal informs the peripheral processor that the CONI is reading the command code message the processor had input to the input FIFO's. The peripheral processor than resets SYSCONW.

The microprocessor through PPI 273 than sets signal DINS0 which is connected to FIFO 262 Serial Out (SO) input. The nibbles stored in the FIFO's 261 and 262 are shifted out over bus field SYSOUT0–SYSOUT3 to PPI 273. The data nibbles are transmitted out of PPI 273 over address/data bus 212 to microprocessor 210 where the nibbles are reassembled into 8 bit data bytes and the checksum compared with the checksum placed into the input FIFO's by the peripheral processor. If the checksum compares, the CONI will reset CONSYSW only if the peripheral processor has reset SYSCONW. The CONI will loop until the peripheral processor has reset SYSCONW before evaluating the command message. This insures that every action by the CONI is preceded by an action by the peripheral processor. Finally, the 8 bit data bytes are stored in RAM 230 for the subsequent transmission of the command code message to console 5.

If the checksum does not compare the microprocessor 210 via PPI 273 sets signal −IFRST and clears FIFO's 261 and 262 and sets signal CONITBL while resetting CONSYSW. Signal CONITBL is passed to the peripheral processor via data selector 265 and bus field C/S0–C/S3. This indicates to the peripheral processor that the last message was not received correctly and should repeated. The peripheral processor than sets SYSCONW and resends the command code message to the input FIFO's 261 and 262. The microprocessor 210 than resets CONITBL, sets CONSYSW and the peripheral processor resets SYSCONW. The received command code message is then read out of the FIFO's and evaluated as explained earlier.

It should be noted that the microprocessor 210 does not directly see the signal IFENBL and is only to used to enable the input FIFO's 261 and 262 to accept a command code message from the DINTIN bus. The peripheral processor controls this signal with the restriction that IFENBL must be set before a command code message is written the DINTIN bus.

The microprocessor 210 will then begin the transfer of the command code message from RAM 230 over bus 212 to Serial TX/RX 240. Serial TX/RX 240 formats the command code message into an asynchronous serial format and transmits the command code message to console 5 via FSK modem 250 and the duplex data path.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An interface circuit for transmitting data messages between a CENTREX equipped central office exchange and a remotely located attendant console, said central office exchange including an analog control unit connected to a peripheral processor, said analog control unit including a control field for sending control signals to said interface circuit and a sense field for receiving control signals from said interface circuit and sending data messages to said interface circuit, said interface circuit comprising:

control and sense decoding means connected to said control and sense fields arranged to output control signals to said interface circuit in response to control signals sent over said control field and transfer control signals and data messages over said sense field;

sequential memory means connected to said control and sense decoding means for receiving and storing from said peripheral processor data messages, said sequential memory means further including memory enabling means connected to said control and sense decoding means, and responsive to said peripheral processor sending an enabling signal to said memory enabling means said data messages are written to said sequential memory means;

controller means connected to said sequential memory means and to said control and sense decoding means, and responsive to said peripheral processor signaling said controller means that data messages have been loaded in said sequential memory means said controller means transfers said data messages out of said sequential memory means in the order in which said data messages where input into said sequentially memory means, and said controller means process said received data messages storing said data messages in a temporary memory; and sending means connected to said attendant console and to said controller means, whereby said controller means transfers said data messages from said temporary memory to said sending means transmitting said data messages to said attendant console.

2. The interface circuit as claimed in claim 1, wherein: said control and sense decoder means comprises a control and sense decoder circuit including a pair of decoders having their inputs connected to said control field, each of said decoders including a plurality of outputs with each output individually enabled by a specific control signal received by both decoders over said control field.

3. The interface circuit as claimed in claim 2, wherein: said control and sense decoder circuit further includes a plurality of flip-flop circuits each of said flip-flop circuits including a plurality of inputs connected to said sense field and each flip-flop circuit including a clock input connected to a specific one of said pair of decoder outputs whereby, control signals applied to said sense field by said peripheral processor are clocked into and captured by one of said flip-flop circuits response to a control signal sent by said peripheral processor on said control field.

4. The interface circuit as claimed in claim 3, wherein: each flip-flop circuit further includes a plurality of outputs, each flip-flop circuit output sends a control signal indicative of the control signal input by said flip-flop circuits.

5. The interface circuit as claimed in claim 1, wherein: said sequential memory means comprises a pair of First In First Out (FIFO) devices connected in series, said FIFO devices are enabled to be written to by a control signal from said control and sense decoder means.

6. The interface circuit as claimed in claim 5, wherein: said memory enabling means is a 2 input AND gate which outputs a positive logic signal to said shift in input of said FIFO devices responsive to a positive logic signal from a FIFO select logic circuit and said enabling signal from said peripheral processor.

7. The interface circuit as claimed in claim 6, wherein: responsive to said positive logic signal applied to said shift in input of said FIFO devices said data messages are transferred a nibble (4 bits) at a time (most significant nibble first) from said control and sense decoding means via said sense field to said FIFO devices.

8. The interface circuit as claimed in claim 1, wherein: said controller means comprises a microprocessor controller for controlling said interface circuit and processing said data messages and said temporary memory is a Random Access Memory (RAM), said microprocessor controller is further connected to a programmable I/O port, said programmable I/O port is connected to said control and sense decoder and to said sense field and further connected to said sequential memory means whereby, said peripheral processor transmits a control signal via said programmable I/O port to said controller means signaling that data messages have been loaded into said sequential memory means.

9. The interface circuit as claimed in claim 8, wherein: said microprocessor controller sends an acknowledgement to said programmable I/O port and said control and sense decoder signaling the peripheral processor that the microprocessor controller is reading said sequential memory.

10. The interface circuit as claimed in claim 8, wherein: said microprocessor controller receives said data messages from said sequential memory a nibble at a time and processes said data messages by assembling the nibbles into 8 bit data bytes, checking for a checksum in each received data message, and additionally analyzing said data message to ascertain if said data message is for said interface circuit or for said attendant console whereby, said data messages for said attendant console, are output to said temporary memory.

11. The interface circuit as claimed in claim 9, wherein: in the event said data message is for said interface circuit and a reply is required said microprocessor controller replies to said data message by sending a data message to said peripheral processor.

12. The interface circuit as claimed in claim 9, wherein: in the event said data message is a diagnostics command said interface circuit replies to said data message by sending signals to said peripheral processor that said interface circuit has entered a diagnostics mode via said control and sense decoding means and said sense field.

13. The interface circuit as claimed in claim 1, wherein: said sending means comprises a Frequency Shift Key (FSK) Modem device and a Universal Serial Asynchronous Receiver Transmitter (USART) device connected to said FSK modem, said USART arranged to receive data messages in parallel form from said controller means and to send said data messages via said FSK modem to said attendant console, said USART further including a control signal output to said controller means signaling that a byte of said data messages has been output by said USART and another data message byte can be transferred to said USART.

* * * * *